United States Patent
Landvik

(10) Patent No.: US 7,555,615 B2
(45) Date of Patent: Jun. 30, 2009

(54) PRODUCT DEMONSTRATION SYSTEM AND METHOD FOR USING SAME

(75) Inventor: Dag Landvik, Saltsjo Boo (SE)

(73) Assignee: Tempur-Pedic Management, Inc., Lexington, KY (US)

( * ) Notice: Subject to any disclaimer, the term of this patent is extended or adjusted under 35 U.S.C. 154(b) by 893 days.

(21) Appl. No.: 10/466,150

(22) PCT Filed: Jan. 10, 2002

(86) PCT No.: PCT/US02/00792

§ 371 (c)(1),
(2), (4) Date: Jul. 10, 2003

(87) PCT Pub. No.: WO02/056606

PCT Pub. Date: Jul. 18, 2002

(65) Prior Publication Data

US 2004/0107149 A1    Jun. 3, 2004

Related U.S. Application Data

(60) Provisional application No. 60/260,763, filed on Jan. 10, 2001.

(51) Int. Cl.
*G06F 13/00* (2006.01)
*G06F 13/28* (2006.01)

(52) U.S. Cl. .................................... 711/154
(58) Field of Classification Search ........... None
See application file for complete search history.

(56) References Cited

U.S. PATENT DOCUMENTS

| 3,889,910 A | 6/1975 | Walters |
| 3,968,530 A * | 7/1976 | Dyson ......................... 5/676 |
| 5,130,794 A | 7/1992 | Ritchey |
| 5,646,602 A | 7/1997 | Gertz et al. |
| 5,729,471 A | 3/1998 | Jain et al. |
| 5,950,173 A | 9/1999 | Perkowski |
| 5,990,927 A | 11/1999 | Hendricks et al. |
| 6,345,239 B1 | 2/2002 | Bowman-Amuah |
| 6,366,914 B1 * | 4/2002 | Stern .......................... 707/10 |
| 6,381,744 B2 | 4/2002 | Nanos et al. |
| 6,397,036 B1 * | 5/2002 | Thean et al. ................ 434/350 |
| 6,553,404 B2 * | 4/2003 | Stern ......................... 709/203 |

(Continued)

OTHER PUBLICATIONS

Formal modeling and analysis of an audio/video protocol: an industrial case study using UPPAAl Havelund, K.; Skou, A.; Larsen, K.G.; Lund, K.; Real-Time Systems Symposium, 1997. Proceedings., The 18th IEEE Dec. 2-5, 1997 pp. 2-13 Digital Object Identifier 10.1109/REAL.1997.641264.*

(Continued)

*Primary Examiner*—Michael B Holmes
(74) *Attorney, Agent, or Firm*—Michael Best & Friedrich LLP

(57) ABSTRACT

The product demonstration system of the present invention is used to familiarize a person with a product. The product demonstration system includes an audio/visual component that is capable of delivering a recording, an adjustable support that is capable of supporting the person, and a control (FIG. 1, 10, 14, 18, 20, 22, 26). The control is operably connected to the adjustable support and the audio/visual component to move the adjustable support and deliver the recording in a coordinated manner to highlight the product.

31 Claims, 1 Drawing Sheet

U.S. PATENT DOCUMENTS

| | | | |
|---|---|---|---|
| 6,564,380 B1 * | 5/2003 | Murphy | 725/86 |
| 6,571,192 B1 | 5/2003 | Hinshaw et al. | |
| 6,603,853 B1 * | 8/2003 | Bennett et al. | 379/265.01 |
| 6,618,972 B2 | 9/2003 | Bar-Yona | |
| 6,654,757 B1 * | 11/2003 | Stern | 707/101 |
| 6,669,485 B2 * | 12/2003 | Thean et al. | 434/365 |
| 6,817,866 B1 * | 11/2004 | Ginzburg et al. | 434/365 |
| 6,876,739 B2 * | 4/2005 | Bennett et al. | 379/265.01 |
| 6,931,406 B2 * | 8/2005 | Stern | 707/10 |
| 6,944,632 B2 * | 9/2005 | Stern | 707/104.1 |
| 7,031,945 B1 * | 4/2006 | Donner | 705/64 |
| 7,069,274 B2 * | 6/2006 | Stern | 707/104.1 |
| 7,120,592 B1 * | 10/2006 | Lewis | 705/26 |
| 7,162,454 B1 * | 1/2007 | Donner et al. | 705/64 |
| 7,180,995 B2 * | 2/2007 | Bennett et al. | 379/265.01 |
| 7,188,151 B2 * | 3/2007 | Kumar et al. | 709/217 |
| 7,203,665 B2 * | 4/2007 | Donner | 705/64 |
| 7,216,109 B1 * | 5/2007 | Donner | 705/64 |
| 7,280,975 B1 * | 10/2007 | Donner | 705/10 |
| 7,281,199 B1 * | 10/2007 | Nicol et al. | 715/203 |
| 7,343,350 B1 * | 3/2008 | Donner | 705/64 |
| 7,379,891 B1 * | 5/2008 | Donner et al. | 705/10 |
| 7,379,900 B1 * | 5/2008 | Wren | 705/26 |
| 7,386,484 B1 * | 6/2008 | Cuzzocrea | 705/26 |
| 7,386,517 B1 * | 6/2008 | Donner | 705/75 |
| 7,415,424 B1 * | 8/2008 | Donner | 705/10 |

OTHER PUBLICATIONS

Bed Display, Version 1, publicly disclosed Jan. 8, 1999.
Bed Display, Version 2, publicly disclosed Aug. 24, 2000.

* cited by examiner

PRODUCT DEMONSTRATION SYSTEM AND METHOD FOR USING SAME

RELATED APPLICATIONS

This application is a 371 of PCT/US2002/00792 filed Jan. 10, 2002, which claims the benefit of U.S. Provisional Application 60/260,763 filed Jan. 10, 2001.

BACKGROUND OF THE INVENTION

Technical Field

The present invention relates generally to product displays, and more particularly to a product demonstration system using multi-media communications.

SUMMARY OF THE INVENTION

The present invention is a new product demonstration system designed to use multi-media communications to display a product. The demonstration system uses a multi-media presentation to entertain customers while educating them about a product. The product demonstration system preferably includes audio/visual capabilities, and a mechanized system capable of physically moving elements of the display. Preferably, the demonstration system also includes a computer that controls and coordinates the various components of the display. An important feature of the demonstration system is the coordination of the multi-media presentation and the mechanisms for articulating the displayed products. The entire system allows a customer to experience the benefits of a product before purchasing the product.

Almost any product could be used along with the demonstration system, but the system may be most effective for products with which a customer is not familiar. Examples of such products could be new products or relatively expensive products. A customer may not be aware of a new product due to its recent introduction into the marketplace, and is therefore not familiar with the benefits the product may offer. Similarly, customers may ignore a relatively expensive product due to its price, but might decide a product's benefits are worth the additional cost and consider purchasing the product after having an opportunity to try it.

A product that has moving parts or audio/visual elements would be well-suited for this demonstration system as well. These products could fully utilize the capabilities of the display system to exhibit the various features of the product. The demonstration system would best be able to showcase a product that has mechanized moving parts capable of being controlled remotely. This would allow the demonstration system to stage an automated presentation to emphasize the product's important features and capabilities.

The demonstration system can also use the included multimedia capabilities to present an audio/visual presentation pertaining to the product. This presentation can be a sales message directed to a certain product, and can explain the benefits and features of the product. The control computer can also coordinate the presentation with product movement to describe a specific feature while that feature is being demonstrated. The coordinated presentation and product movement provides the customer with timely information that highlights the features and benefits of a product.

Preferably, the demonstration system includes some type of barrier to isolate the customer from the surrounding environment. The system including such an insulative aspect may be effectively employed around conventions, trade shows, retail stores, or other environments with a lot of activity that may distract potential customers. The barrier preferably provides privacy and reduces outside distractions for customers, and allows them to relax and focus on the overall presentation. The barrier may be an elaborate structure or enclosure, or it could simply be a mask or headpiece. The purpose of the barrier is to create a comfortable atmosphere for the customer to experience the product demonstration and/or multi-media presentation.

Figure 1:
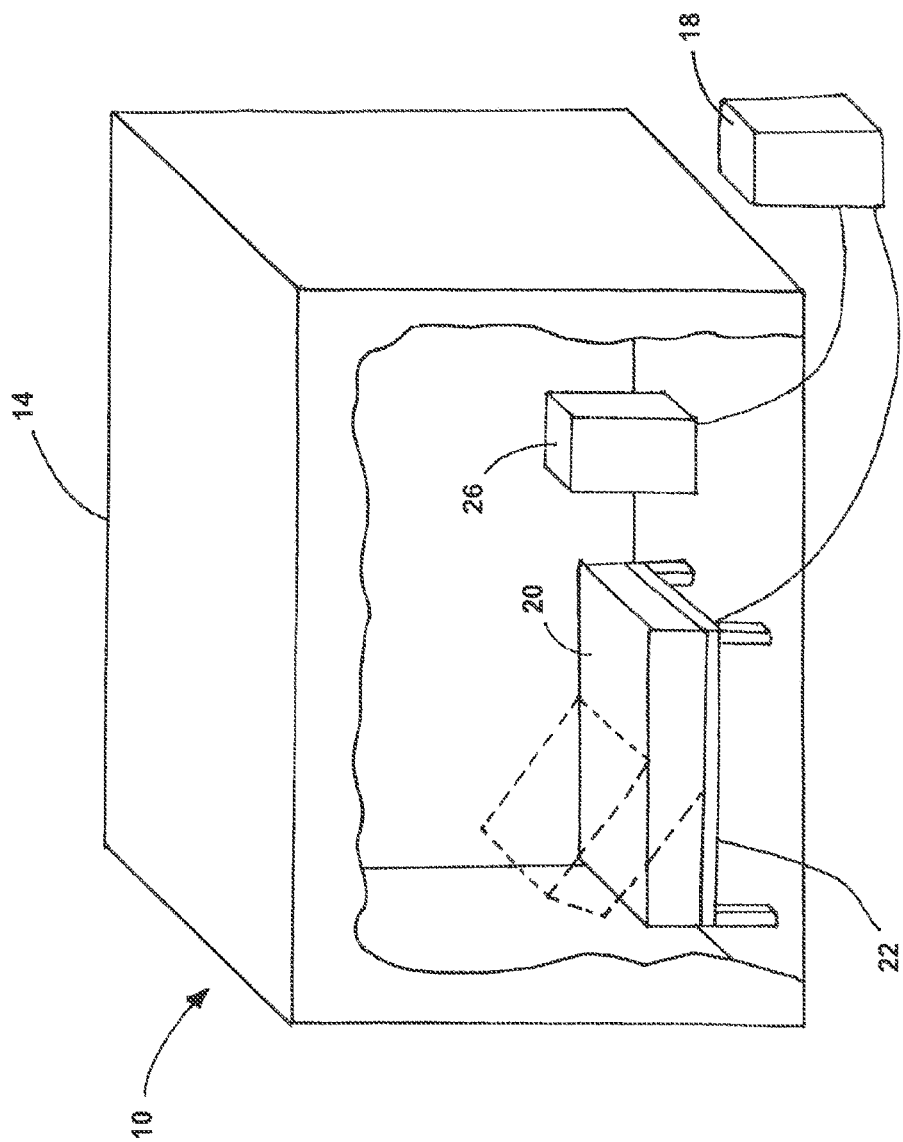
FIG. 1 is a cut-away view illustrating a preferred embodiment for a product demonstration system of the present invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

FIG. 1 illustrates the preferred embodiment of a product display or demonstration system 10 designed to coordinate a multi-media presentation and product articulation to exhibit the features of a product. The display preferably entertains customers while educating them about a product. The main components of the demonstration system 10 in the preferred embodiment are a barrier, a product presentation, and a control computer 18. The control computer 18 preferably coordinates portions of the multi-media presentation and the product articulation to highlight the benefits of products. The entire demonstration system 10 allows a customer to experience the benefits of the included products before purchasing the products.

The products included in the preferred embodiment of the demonstration system 10 include a mattress 20 and relaxation and mental training techniques. Other products may be used in the demonstration system 10, but the system 10 can best exhibit products that are capable of movement or products which are multi-media elements. A product with movable parts that can be moved remotely is able to utilize to the capabilities of the control computer 18 to coordinate product articulation to a multi-media presentation. In the preferred embodiment, the control computer 18 can recline or reposition an adjustable support 22 that supports the mattress 20 to demonstrate the features of the mattress 20 while the multi-media presentation describes those features.

Without a chance to test the products, a customer may not feel comfortable purchasing a mattress or a CD with a relaxation and mental training technique, and this demonstration system 10 allows a customer to analyze both products together. The mattress 20 preferably has a visco-elastic layer that conforms to the shape of a persons body. Mattresses with this type of material are substantially different than conventional mattresses, and are generally more expensive as well. A customer may not realize the advantages of the mattress 20, or believe the mattress is worth the additional cost unless they have the opportunity to experience the benefits themselves.

Similarly, many people may be skeptical of relaxation and mental training techniques and are hesitant to try such techniques. They are often unaware of the benefits relaxation and mental training techniques may offer them. Along with the previously mentioned mattress 20, customers may not realize the benefits of these products until they have the opportunity to assess the products themselves. The present invention preferably provides a convenient controlled environment for customers to experience the combined benefits of both products together.

The first component of the product demonstration system 10 is the barrier. In the preferred embodiment, the barrier is an enclosure 14, but it could be anything that separates a person's senses of sight and sound from the surrounding environment, such as a mask, headpiece, helmet, room, divider, structure, or other similar devices. The two main functions of the enclosure 14 are to shield the people inside the enclosure 14 from outside distractions, and to provide a means for focusing the attention of the potential buyer on the product and coordinated multi-media presentation. The enclosure 14 preferably provides privacy and may block light and/or sound to reduce distractions and create an environment that is optimal for relaxation. The purpose of the mattress and relaxation and mental training techniques in the preferred embodiment is to help a person rest or relax, so a peaceful surrounding is especially important to fully experience the benefits of these products.

A means to focus the attention of a potential buyer is also provided by the enclosure 14. While within the enclosure 14, the customers are an attentive audience willing to learn about the benefits of these products. Eliminating distractions allows customers to enjoy the product presentation and concentrate on the information provided. In the preferred embodiment, the enclosure 14 may also provide an audio/visual component 26 used for the display.

The enclosure 14 in the preferred embodiment is a temporary structure that can be easily assembled or disassembled. This allows the display to be taken to customers in various locations, such as trade shows, conventions, retail establishments, or any other place people may gather. Because the demonstration system 10 is preferably intended to be used around crowds, it is especially important that the enclosure 14 provides an isolated atmosphere to reduce disturbances.

In FIG. 1, the enclosure 14 of the preferred embodiment is illustrated as a plain structure. However, the enclosure 14 could be designed in any manner to accentuate a specific product being displayed by the demonstration system 10. One possibility for the mattress might be to construct the enclosure 14 to resemble a space cabin. This embodiment may highlight the connection between the visco-elastic material in the mattress 20, and the material's development as part of the American space program. The space cabin construction could also provide a theme for a presentation relating to the products. Similarly, the enclosure 14 may simply be a space helmet with headphones to conjure up an image of space travel.

The demonstration system 10 also provides a product presentation for customers. This second component of the system includes the products themselves, and a multi-media presentation relating to the products. In the preferred embodiment, the products displayed by the demonstration system 10 are a mattress 20 and relaxation and mental training techniques. The mattress 20 includes visco-elastic foam and the adjustable support 22 includes mechanisms for articulating the adjustable support 22. The adjustable support 22 can be remotely adjusted or repositioned, and is preferably controlled by the control computer 18. FIG. 1 illustrates only one of these adjustable supports 22 as part of the demonstration system 10, but additional supports 22 could also be installed to accommodate multiple customers at the same time. A customer will preferably lie on the mattress while a multimedia presentation is played.

An audio/visual component 26 is preferably installed within the enclosure 14 to play a presentation relating to the products. The audio/visual component 26 may include both audio and visual capabilities or can, similar to the preferred embodiment, only include one of either audio or visual capabilities. In the preferred embodiment, as illustrated in FIG. 1, the audio/visual component 26 includes an audio speaker, but headphones for an individual customer could also be used. The audio/visual component 26 could also be incorporated into the control computer 18.

The demonstration system 10 preferably uses the audio/visual component 26 to play a product presentation. This presentation may include entertainment, a sales message, or any other information a merchant would like to convey to a customer. Specific product information in the presentation may be directed to specific features of the product, and the control computer 18 can articulate the adjustable support 22 to demonstrate features of the mattress 20 or relaxation and mental training recording while the corresponding information is being played.

The presentation is preferably saved on a retrievable storage medium, such as a CD, and this storage medium is then read by either the control computer 18, or the audio/visual component 26. In the preferred embodiment, a single CD contains both the audio recording and the control signals for the adjustable support 22. The control computer 18 then preferably reads the CD and uses the dual functionality to coordinate the product articulation and the audio recording.

As previously mentioned, the presentation may encompass any subject, but will generally be directed to the product being displayed. Described below is a summary of the presentation used in the preferred embodiment, but it should be understood that the presentation may vary greatly depending on the product being displayed. The products displayed in the preferred embodiment include a mattress 20 and relaxation and mental training techniques, and this summary provides an example of how the presentation can be incorporated with the features of a product. In the preferred embodiment, the audio presentation includes three stages, a rocket simulation, product information, and guided relaxation.

The first stage preferably explains Tempur Material's origin with the American space program and simulates a rocket launch. In the preferred embodiment, the adjustable support 22 reclines and the multi-media equipment 26 plays a recording of a rocket launch with a countdown, rocket engine sounds, and radio communication. During the rocket simulation, the presentation pretends to take the customer further from the Earth's gravitational pull, and the message reinforces the visco-elastic mattress's feeling of weightlessness.

In the second stage, the customer is informed about the benefits of the mattress 20 including the visco-elastic Tempur Material. Examples of the benefits may include conforming to the shape of a body, providing even support, and relieving pressure on a body. The recording preferably educates the customer about the importance of sleep and the proven advantages of a quality sleep system.

Guided relaxation is the third stage which demonstrates the benefits of relaxation and mental training techniques to the customer. The recording preferably explains the ease of using relaxation and mental training techniques, and how the techniques can help people in their daily lives. In the preferred embodiment, CDs containing relaxation and mental training techniques are an additional products that are being displayed in conjunction with the mattress. A series of CDs is described that assist in relaxation and mental training techniques, and incorporate the techniques into a person's sleep process. The recording provides a sample guided relaxation session designed to guide the listener into sleep. The recording then pretends to ease the listener back to Earth before ending the presentation.

The final component of the display system is a computer 18 that controls the entire product presentation. The computer 18 preferably includes a micro-processor and coordinates the audio/visual message with the movement of the mattress 20. In the preferred embodiment, the computer 18 is connected to the audio/visual component 26 and the adjustable support 22. FIG. 1 illustrates the computer 18 as being disposed outside the enclosure 14 in the preferred embodiment, but the computer 18 could also be disposed inside the enclosure 14. The control computer 18 preferably is capable of reading a recording saved in a retrievable storage medium, and can transmit signals for movement from the saved medium to the mechanized parts of the adjustable support 22.

Preferably, the audio, visual, and mechanized aspects of the presentation are all coordinated to fall along a predetermined course. In the preferred embodiment, specific movements of the adjustable support 22 are coordinated with certain portions of the multi-media presentation. For example, the support 22 reclines during the lift-off phase of the presentation. The control computer 18 preferably combines the various elements of the demonstration system 10 to provide the customer with an experience that exhibits the benefits of the mattress 20 and relaxation and mental training techniques.

I claim:

1. A product demonstration system comprising:
   a mattress;
   an audio/visual component capable of delivering a recording;
   an adjustable mattress support adapted to support the mattress; and
   a control operably connected to the audio/visual component and the adjustable mattress support to move the adjustable mattress support and deliver the recording to a person on the mattress in a coordinated manner.

2. The product demonstration system of claim 1, wherein the adjustable mattress support includes a head portion that is movable between an inclined position and a declined position.

3. The product demonstration system of claim 2, wherein the adjustable mattress support includes a foot portion that is movable between an inclined position and a declined position.

4. The product demonstration system of claim 1, wherein the audio/visual component includes a cassette player.

5. The product demonstration system of claim 1, wherein the audio/visual component includes a compact disc player.

6. The product demonstration system of claim 1, wherein the control moves the adjustable mattress support in response to the recording.

7. The product demonstration system of claim 6, wherein the recording includes signals, and wherein the control moves the adjustable mattress support in response to the signals of the audio recording.

8. The product demonstration system of claim 1, wherein the audio/visual component includes a video disc player.

9. The product demonstration system of claim 1, wherein the audio/visual component includes a video cassette player.

10. The product demonstration system of claim 1, wherein the recording simulates a rocket launch.

11. The product demonstration system of claim 1, wherein the recording provides the person with information relating to a product.

12. The product demonstration system of claim 1, wherein the recording provides guided relaxation and mental training to the person.

13. The product demonstration system of claim 1, wherein the recording includes three sequential stages including a first stage that simulates a rocket launch, a second stage that provides the person with information relating to the product, and a third stage that provides guided relaxation and mental training to the person.

14. The product demonstration system of claim 1, wherein the control moves the adjustable mattress support and delivers the recording in a coordinated manner to highlight a product.

15. The product demonstration system of claim 1, wherein the mattress includes a visco-elastic layer.

16. The product demonstration system of claim 14, wherein the product includes a relaxation and mental training audio recording.

17. The product demonstration system of claim 14, wherein the product includes a relaxation and mental training audio recordings and wherein the mattress has a visco-elastic layer.

18. The product demonstration system of claim 1, further comprising a barrier to at least partially isolate the person from the surrounding environment.

19. The product demonstration system of claim 18, wherein the barrier includes an enclosure to at least partially visually and audibly isolate the person from the surrounding environment.

20. The product demonstration system of claim 19, further comprising lighting within the enclosure, wherein the control manipulates the lighting, moves the adjustable mattress support, and delivers the recording in a coordinated manner.

21. The product demonstration system of claim 18, wherein the barrier includes curtains to at least partially visually isolate the person from the surrounding environment.

22. The product demonstration system of claim 18, wherein the barrier includes a helmet to at least partially audibly isolate the person from the surrounding environment.

23. The product demonstration system of claim 22, wherein the helmet also at least partially visually isolates the person.

24. The product demonstration system of claim 1, wherein the audio/visual component includes speakers.

25. The product demonstration system of claim 1, wherein the audio/visual component includes headphones.

26. The product demonstration system of claim 1, wherein the control includes a computer.

27. A product demonstration system comprising:
   a mattress;
   an audio/visual component capable of delivering a recording;
   an adjustable mattress support adapted to support the mattress;
   a control operably connected to the audio/visual component and the adjustable mattress support to move the adjustable mattress support and deliver the recording to a person on the mattress in a coordinated manner; and
   a barrier to at least partially isolate the person from the surrounding environment.

28. The product demonstration system of claim 27, wherein the barrier includes an enclosure to at least partially visually and audibly isolate the person from the surrounding environment.

29. The product demonstration system of claim 28, further comprising lighting within the enclosure, wherein the control manipulates the lighting, moves the adjustable mattress support, and delivers the recording in a coordinated manner.

30. The product demonstration system of claim 27, wherein the barrier includes curtains to at least partially visually isolate the person from the surrounding environment.

31. The product demonstration system of claim 27, wherein the barrier includes a helmet to at least partially audibly isolate the person from the surrounding environment.

* * * * *